July 7, 1964 R. B. FULLER 3,139,957
SUSPENSION BUILDING
Filed Jan. 24, 1961 8 Sheets-Sheet 1

INVENTOR.
RICHARD BUCKMINSTER FULLER
BY
ATTORNEYS.

July 7, 1964 R. B. FULLER 3,139,957
SUSPENSION BUILDING
Filed Jan. 24, 1961 8 Sheets-Sheet 2

INVENTOR.
RICHARD BUCKMINSTER FULLER
BY
ATTORNEYS.

INVENTOR.
RICHARD BUCKMINSTER FULLER
BY
ATTORNEYS.

July 7, 1964

R. B. FULLER 3,139,957

SUSPENSION BUILDING

Filed Jan. 24, 1961

INVENTOR.
RICHARD BUCKMINSTER FULLER
BY

ATTORNEYS.

July 7, 1964 R. B. FULLER 3,139,957
SUSPENSION BUILDING
Filed Jan. 24, 1961 8 Sheets-Sheet 5

INVENTOR.
RICHARD BUCKMINSTER FULLER
BY
ATTORNEYS.

July 7, 1964

R. B. FULLER 3,139,957

SUSPENSION BUILDING

Filed Jan. 24, 1961

INVENTOR.
RICHARD BUCKMINSTER FULLER
BY
*Robertson & Smythe*
ATTORNEYS.

July 7, 1964   R. B. FULLER   3,139,957
SUSPENSION BUILDING

Filed Jan. 24, 1961   8 Sheets-Sheet 7

INVENTOR.
RICHARD BUCKMINSTER FULLER
BY
*Robertson & Smythe*
ATTORNEYS.

July 7, 1964

R. B. FULLER 3,139,957

SUSPENSION BUILDING

Filed Jan. 24, 1961

INVENTOR.
RICHARD BUCKMINSTER FULLER
BY
ATTORNEYS.

3,139,957
Patented July 7, 1964

3,139,957
SUSPENSION BUILDING
Richard Buckminster Fuller, 407 S. Forest St., Carbondale, Ill.
Filed Jan. 24, 1961, Ser. No. 88,245
11 Claims. (Cl. 189—1)

My invention relates to building construction.

Summary

I have discovered how to make building structures and components possessing in substantial measure the advantages of catenary suspension heretofore confined principally to the suspension bridge. The catenary cables of the suspension bridge sag downwardly to the mid-point of the bridge, and would seem to possess no utility in any structure which arches upwardly. So it has been a surprise to me to find that there is a way by which a catenary suspension system can be converted into an arched structure of domical or polygonal form. By breaking up the suspension cables into increments suspending an ascending series of polygonal or circular frames stepped upwardly one within another, altitude is gained, replacing the catenary sag of the bridge cables with a rising, arched, suspension system. My new structure comprises a series of box frames of polygonal, cylindrical or other form, these frames being of progressively varying sizes arranged in a concentric array at sequentially different heights above a common plane of reference and in vertically overlapping spaced relation to one another. Tension elements such as flexible cables or wires extend between and are secured to adjacent pairs of the box frames in the series. These tension elements include tension members extending downwardly from their points of securement to one frame of a pair to their respective points of securement to the other frame of the pair. In this manner, successive frames of the series are suspended one from another in either a rising, descending or level series as may be desired. Other tension members extend upwardly from their points of securement to one frame of a pair of their respective points of securement to the other frame of a pair whereby successive frames in the series are anchored down one to another. The suspension members and anchor members complement one another in performing a third function, the provision of a tensioned buttress against tilting of the compression members comprised in the frames. Thus are satisfied the three functions of (1) suspension, (2) anchoring and (3) buttressing, all by the simplest arrangement of tension wires in combination with the series of frames as disclosed. Additionally, these tension wires act to stabilize the frames themselves, and furnish a tension system efficiently disposed for resisting torquing and counter-torquing of the frames about the central axis of the structure. These can be catalogued as functions (4) and (5). Still other tension members may be provided that will be disposed in radial planes containing the central axis of the structure. In the case of a structure utilizing a series of frames of polygonal form, the several tension members are secured to the vertexes of the polygons. Those tension members lying in radial planes will apply tension forces to the upper peripheries of the frames and thereby reduce compressive forces imposed on such peripheries by others of the tension members.

Description

With reference to the drawings I shall now describe the best mode contemplated by me for carrying out my invention.

Figure 8:
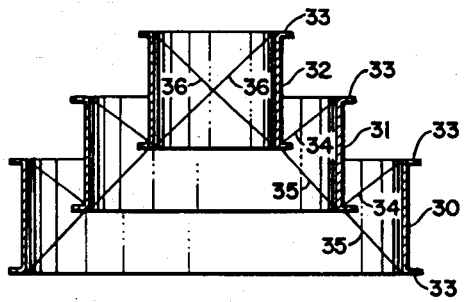
Figure 9:
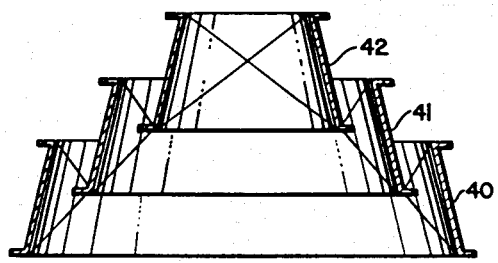
Figure 8A:
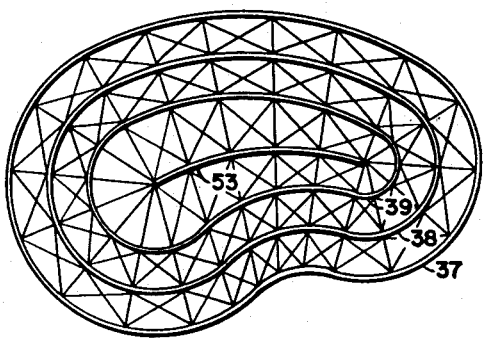
Figure 10:
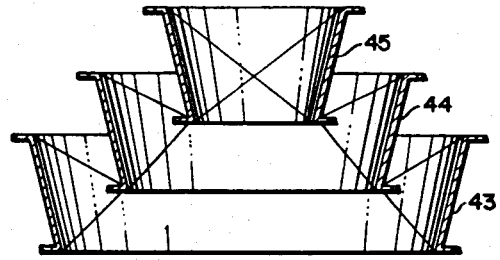
Figure 11:
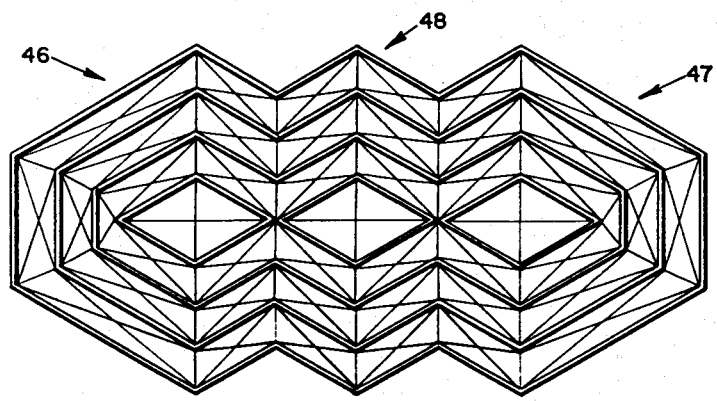
Figure 12:
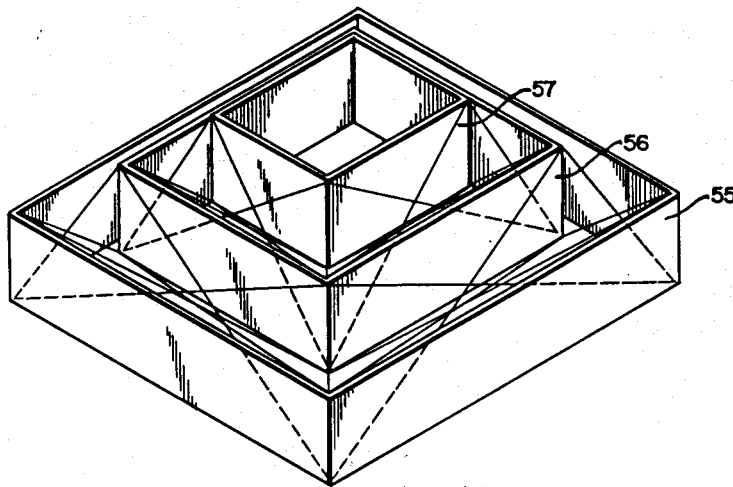
Figure 13:
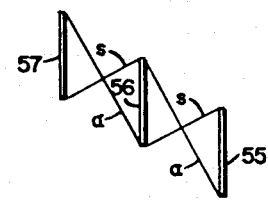
Figure 14:
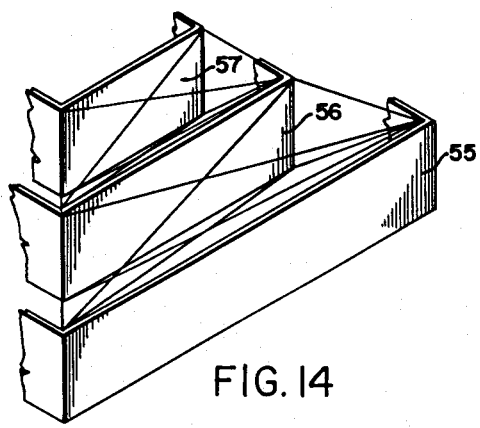
Figure 15:
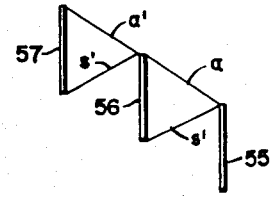
Figure 16:
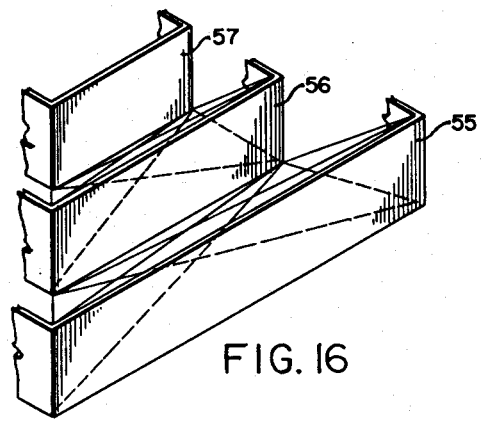
Figure 17:
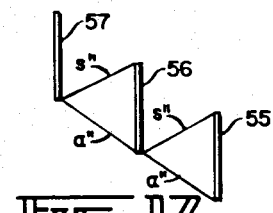

FIGS. 8 to 17 inclusive are diagrammatic representations illustrative of the general scope of applicability of my suspension building system to various building forms with the use of different kinds of box structures and with several alternative dispositions of the suspension and anchoring cables, FIG. 8 being a vertical sectional view illustrative of flanged cylindrical box sections, FIG. 8a a plan view illustrative of an asymmetrical form of my construction, FIG. 9 a vertical sectional view illustrative of flanged box sections of frusto-conical form, FIG. 10 illustrative of the use of similar box sections of inverted frusto-conical form, FIG. 11 a plan view illustrative of a special elongated form of box section, FIG. 12 an isometric perspective view of another form of framing and one alternative arrangement of the suspension and anchoring cables, FIG. 13 a diagram analyzing the vertical components of the reach of the cables of FIG. 12, FIG. 14 a partial view similar to FIG. 12 with an alternative disposition of the cables, FIG. 15 a diagram analyzing the vertical components of the reach of the cables of FIG. 14, FIG. 16 a view similar to FIG. 14 showing a still further disposition of the cables, and FIG. 17 a diagram analyzing the vertical components of the reach of the cables of FIG. 16.

Figure 18:
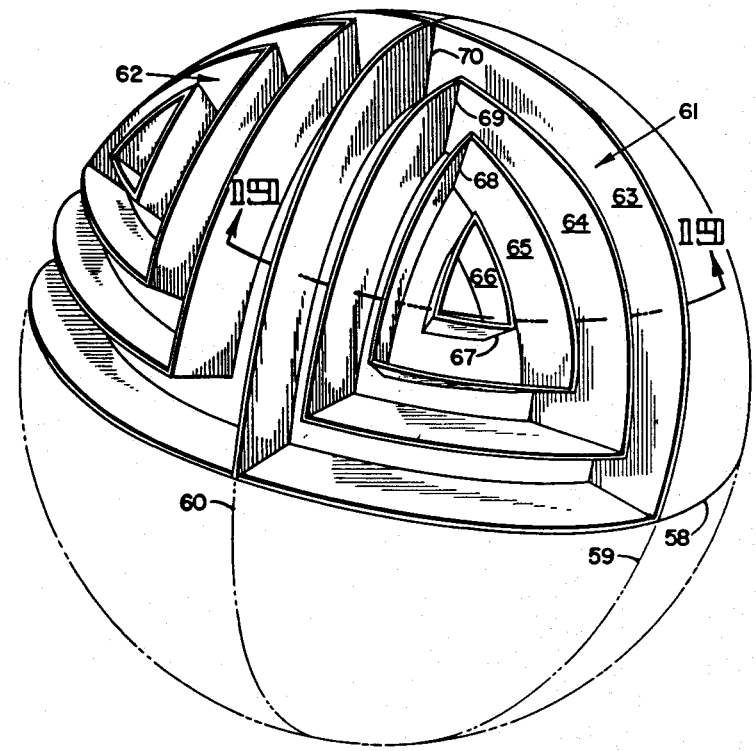

FIG. 18 is a perspective view illustrating the application of my invention to a spherical or hemispherical structure based on the spherical octahedron.

Figure 19:
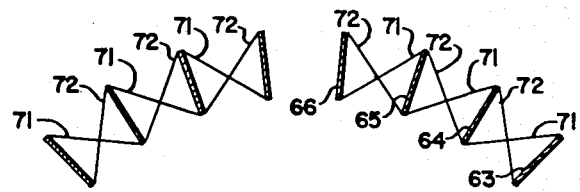

FIG. 19 is a detail cross-sectional view taken on the line 19—19 of FIG. 18.

Figure 1:
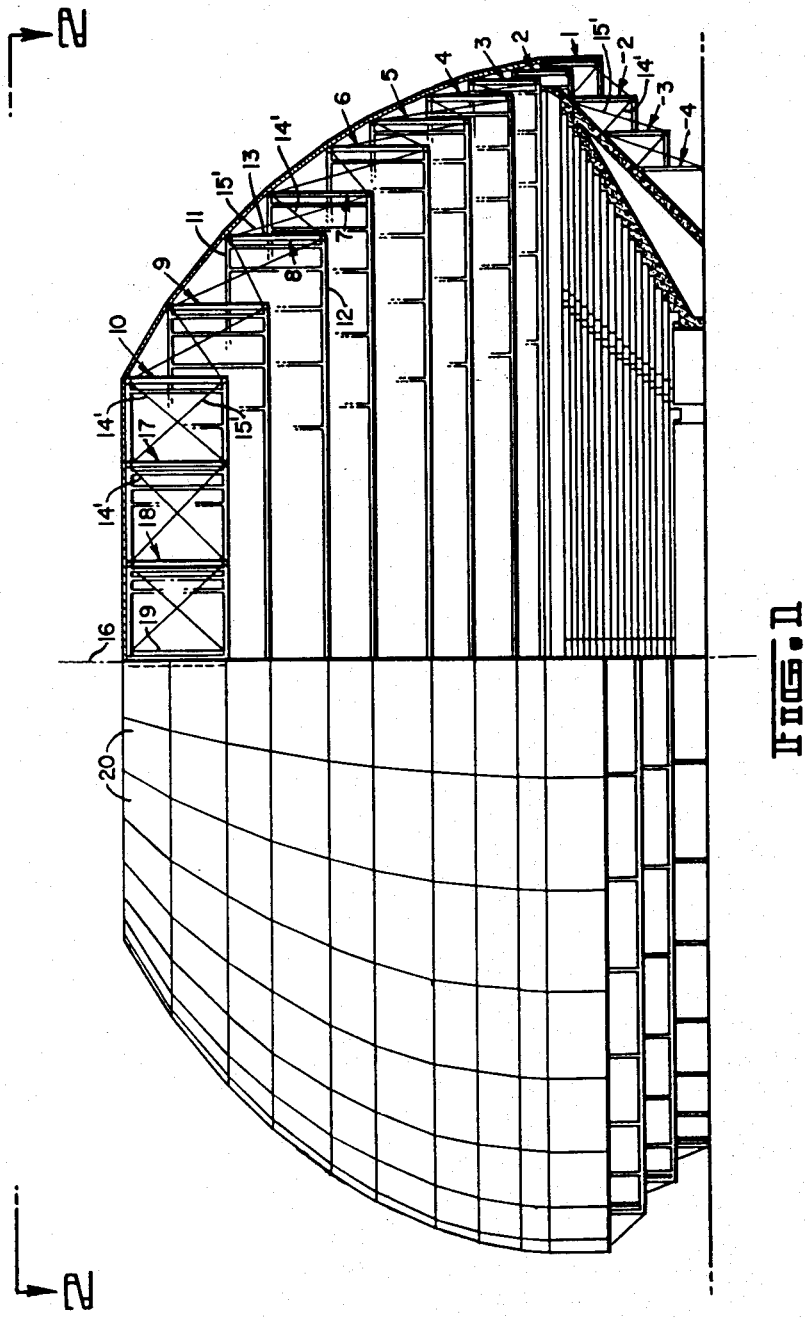
FIG. 1 is an elevational view partly in vertical section illustrating the application of my invention to a roofed stadium or concert hall.
Figure 2:
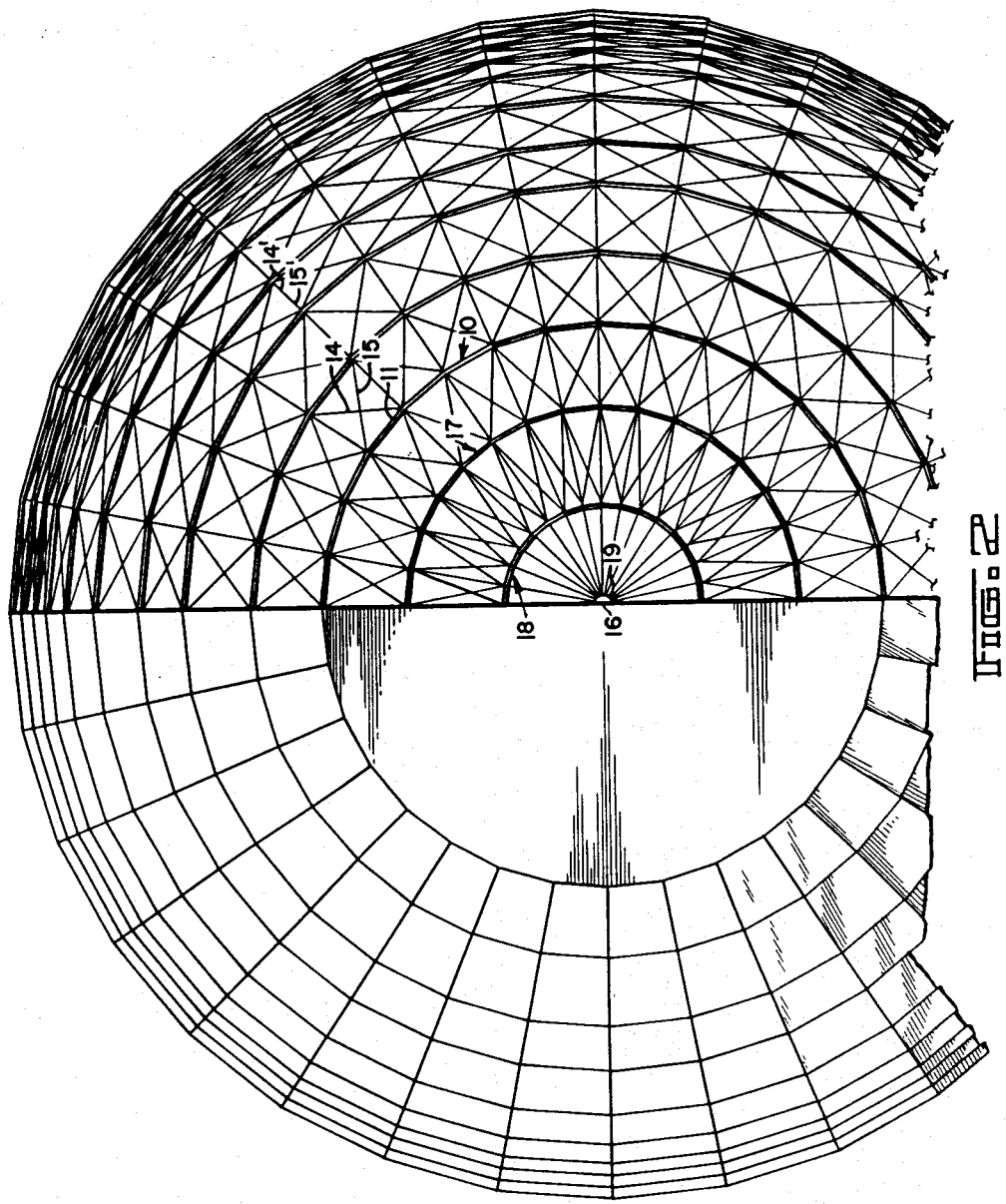
FIG. 2 is a plan view of the FIG. 1 structure with the right-hand portion of the roof covering removed to reveal the suspension frame construction, taken as indicated at 2—2 in FIG. 1.

In FIGS. 1 and 2 we see a structure embodying my invention in one of its preferred forms as applied, for example, to a roofed sports arena or stadium. The structure comprises a series of polygonal box frames 1 to 10 inclusive, -2, -3 and -4. In this particular construction each frame is comprised of upper chord members 11 and lower chord members 12 forming the upper and lower peripheries of the respective frames, and vertical compression columns or struts 13 extending between the vertexes of the polygon formed by the upper chord members 11 and the corresponding vertexes of the polygon formed by the lower chord members 12. Considering an individual frame as a whole, such frame is an annular form faceted into rectangles around its rim or periphery by the members 11, 12 and 13. The series of box frames 1 to 10 inclusive, -2, -3 and -4, are of progressively varying sizes and they are arranged in a concentric array at sequentially different heights above a common plane of reference (for instance, the horizontal plane of the foundation) and in vertically overlapping spaced relation one to another. Tension elements extend between and are secured to adjacent pairs of the box frames in the series, these tension elements including tension members 14, 14' which extend downwardly from their points of securement to the lower frame of a pair to their respective points of securement to the upper frame of the pair whereby successive frames in the series are suspended one from another [function (1) of the Summary given at the beginning of this specification].

The tension elements also include other tension members 15, 15' extending upwardly from their points of securement to the lower frame of a pair to their respective points of securement to the upper frame of the pair whereby successive frames in the series are anchored down one to another [function (2) of the Summary]. Tension members 14 and 15 may be arranged in crisscrossing pairs as shown in FIG. 2. In this particular embodiment the same tension members are crisscrossed when viewed in plan, FIG. 2, as well as when viewed in elevation.

The downwardly extending tension members may include members disposed in radial planes containing the central axis 16 of the structure, and the upwardly extending tension members 15 also may include members disposed in such radial planes. In FIG. 1 the particular tension members 14' and 15' which come into view are those which lie in one of such radial planes. In the preferred construction shown, the several tension members 14, 15, 14', 15' are secured to the respective polygonal box frames at the vertexes thereof. Also in this particular construction the domical structure formed by the series of suspended box frames is flattened on top by the provision of a series of box frames 10, 17 and 18 of progressively varying sizes arranged in a concentric array above the common horizontal plane of reference and in horizontally spaced relation one to another. As in the rest of the structure, we have the tension members 14, 14' functioning as suspension members, and 15, 15' functioning as anchoring members. All such tension members 14, 14', 15, 15' complement one another in performing a third function, the provision of a tensioned buttress against tilting of the compression members 13 comprised in the frames [function (3) of the preceding Summary]. Additionally, these tension members act to stabilize the frames themselves and furnish a tension system efficiently disposed for resisting torquing and counter-torquing of the frames about the central axis 16 of the structure [functions (4) and (5) of the Summary]. Further, the tension members 14', 15' which extend outwardly from the upper and lower peripheries of the frames will apply tension forces which will reduce compressive forces imposed on such peripheries by others of the tension members.

Annular frames 1 to 10 inclusive are illustrative of a rising series of frames, annular frames 1, –2, –3 and –4 illustrative of a descending series of frames, and annular frames 10, 17 and 18 illustrative of a level series. The level series may terminate in a single central strut or annulus 19. Beginning at the base of the structure we have the annular frame –4 from which is suspended at a higher elevation the frame –3 from which in turn is suspended the frame –2 and then in succession we have suspended each from the other in the order named the frames 1, 2, 3 and so on, altitude being gained meanwhile in the progressively stepped suspension system. Similarly, frame 17 is suspended from frame 10, frame 18 from 17, and center post 19 from frame 18. As in the suspension bridge the tension aspect of the structure is highly significant through utilization of the more favorable tensile strengths of materials as contrasted with their vastly inferior compressive strengths. It would be difficult to imagine an upside down suspension bridge and yet that is in effect what I have achieved when my structure is considered in any given vertical profile. Altitude is gained by breaking up the suspension system into steps and stability of the stepping is attained by the three dimensional aspect of the structure as contrasted with the essentially two dimensional system of the suspension bridge. The end result is a tremendous saving through the realization of a larger building per unit weight of the material employed in its construction, this in turn being the benefit conferred by my discovery of how to get more use from the most favorable property of materials, namely tensile strength. Essentially I have devised a building construction which in large measure replaces heavy columns and beams with a light spidery array of tension wires or cables.

The structure can be roofed in many ways. In the embodiment of FIGS. 1 and 2, roofing sheets 20 of trapezoidal form are shown. The method by which these are attached and the detail of their construction are not an essential part of my present invention.

Figure 3:
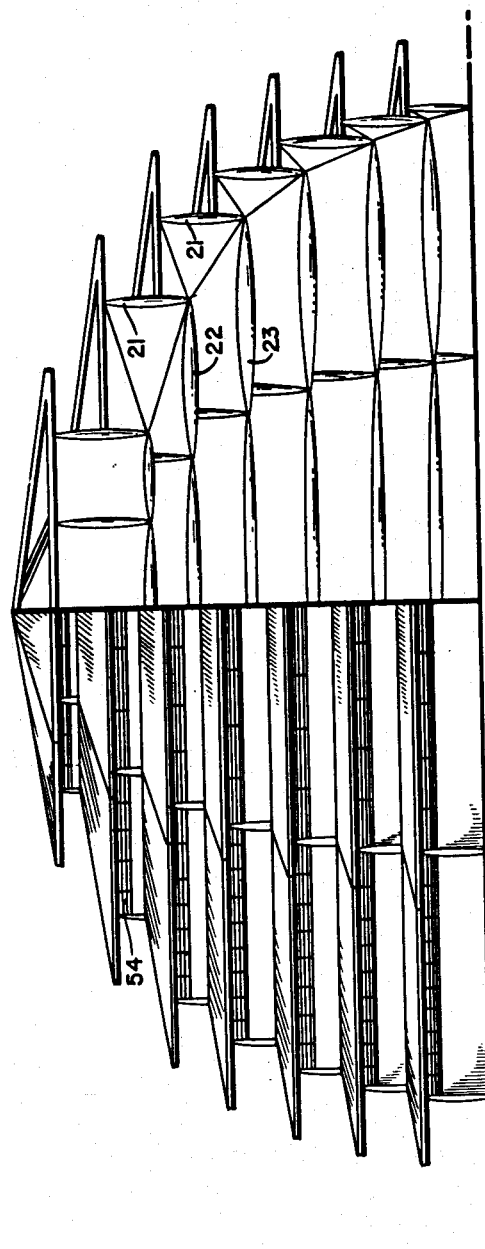
FIG. 3 is an elevational view illustrating another embodiment of the invention, the right-hand portion being shown in diagrammatic vertical section.

In FIG. 3 I have shown a modified frame construction in which the compression members 21, 22, etc. are comprised of elliptical struts designed for increased efficiency in the use of materials in compression. Pagoda roofing is here employed to advantage as an efficient watershed with provision for good ventilation by means of windows or louvres 54 set well under the overhangs in the roof.

Figure 5:
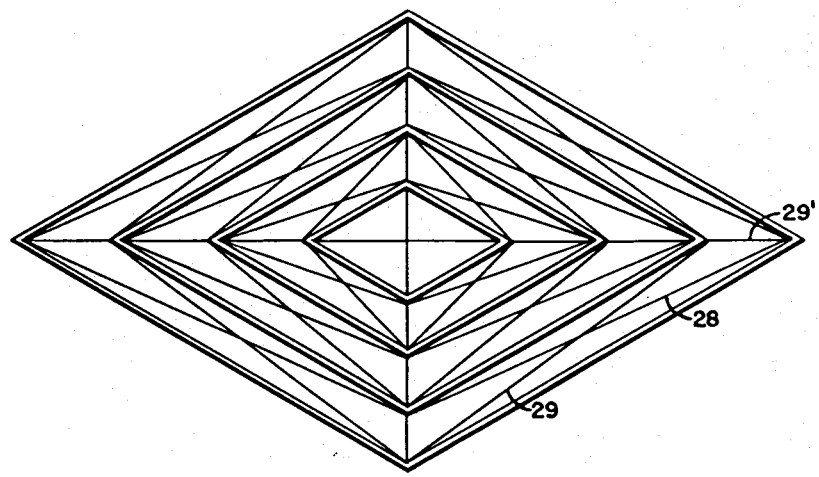
FIG. 5 is a plan view of the suspension frame system of the FIG. 4 structure, taken as indicated at 5—5 in FIG. 4.
Figure 4:
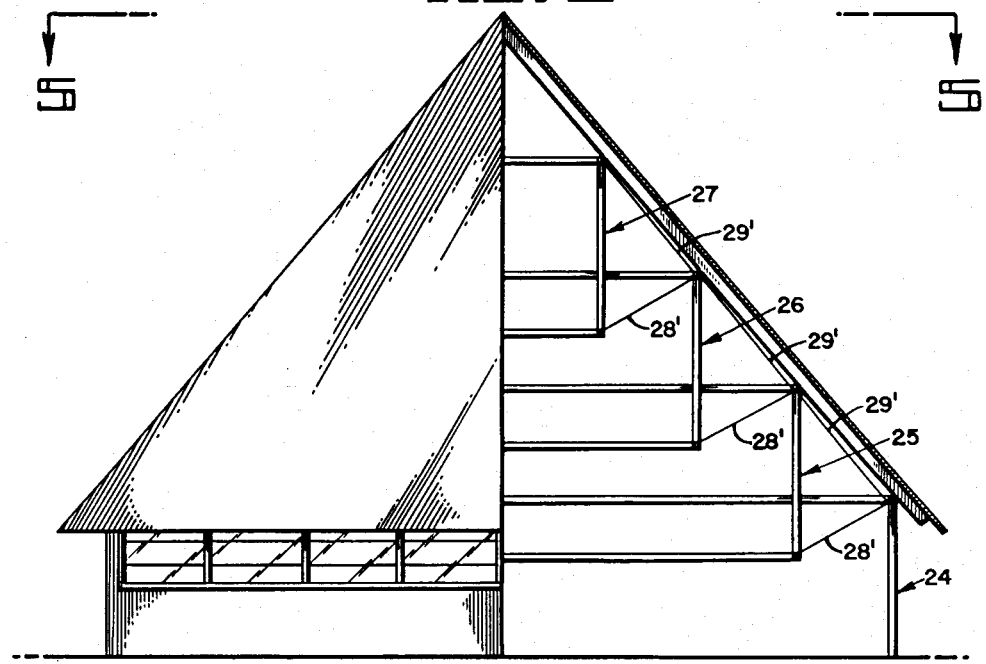
FIG. 4 is a similar view of another embodiment.

In FIGS. 4 and 5 the polygonal frames comprise a series of diamond shaped frames 24 to 27 inclusive. Suspension wires 28, 28' suspend each successively higher frame from the lower-numbered frame of the series. Anchoring wires 29, 29' disposed in radial planes containing the central axis of the structure are provided as before. Both the wires 28, 28' and the wires 29, 29' are secured to the upper edge of the lower frame of each pair of frames, in this respect representing a variation from the crisscrossing arrangment of FIGS. 1 and 2. The roof structure here simplifies into a generally pyramidal form.

It is essential to understand that the box or annular frames of my invention may be either skeletal as when made of strust or tubes as I have described, or continuous as when made in the form of sheets, plates or panels.

In FIG. 8 we see an example of the latter construction in which the frames or annuli are comprised of simple cylinders 30, 31 and 32. These may have marginal flanges 33 as shown. In the embodiment typified here the suspension wires 34 extend downwardly from the upper edge of the lower frame of a pair to the lower edge of the upper frame of the pair, and the anchor cables 35 extend from the lower edge of the lower frame of a pair to the lower edge of the upper frame of the pair (instead of to the upper edge of the pair as in the embodiment of FIGS. 1 and 2). The system of wires 35 may be projected as at 36 if desired, providing a continuous line of tension from the top to the base of the structure.

FIG. 8a shows the application of my invention to an asymmetrical structure comprising the frames 37, 38, 39, 53, which may be of any desired peripheral contour.

FIG. 9 represents another kind of continuous annular frame 40, 41, 42, being one of frusto-conical form.

In FIG. 10 the frusto-conical frames 43, 44, 45 are inverted from the position of those in FIG. 9. If the sheet containing FIGS. 8, 9 and 10 is inverted, we see three additional variants in which either cylindrical or frusto-conical frames are arranged in what I have previously referred to herein as a descending series. This would equate to the series –2, –3, –4 in FIG. 1.

FIG. 11 shows the application of my invention to an elongated structure of involute-evolute form comprising end sections 46, 47, of generally hexagonal pyramidal form and a connecting section of involute-evolute form, affording added strength to such an elongated structure. The disposition of the suspending-anchoring-buttressing cables may be generally similar to that in the structures already described. The construction of the frames themselves as seen in elevation will be generally similar to that described with reference to FIG. 1.

Figure 7:
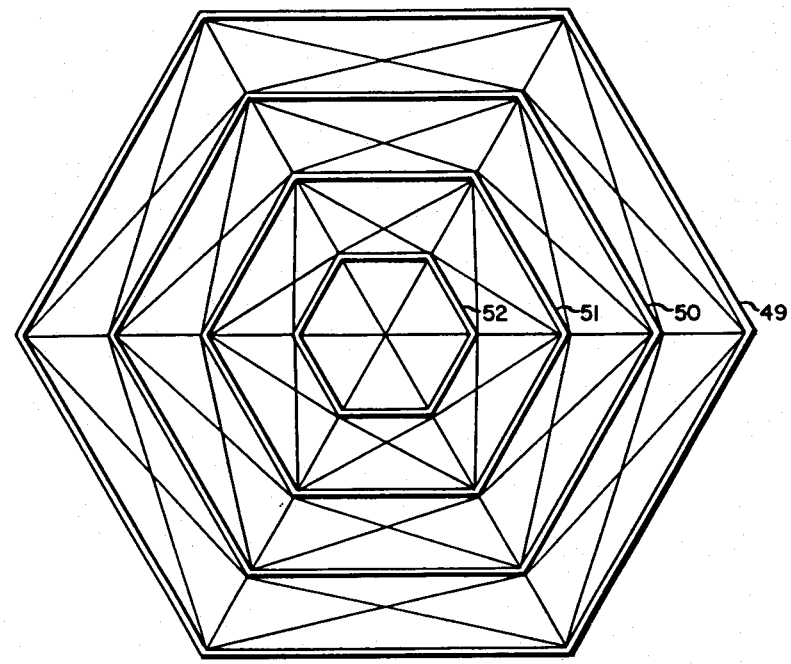
FIG. 7 is a plan view of the FIG. 6 structure, roof covering omitted, taken as indicated at 7—7 in FIG. 6.
Figure 6:
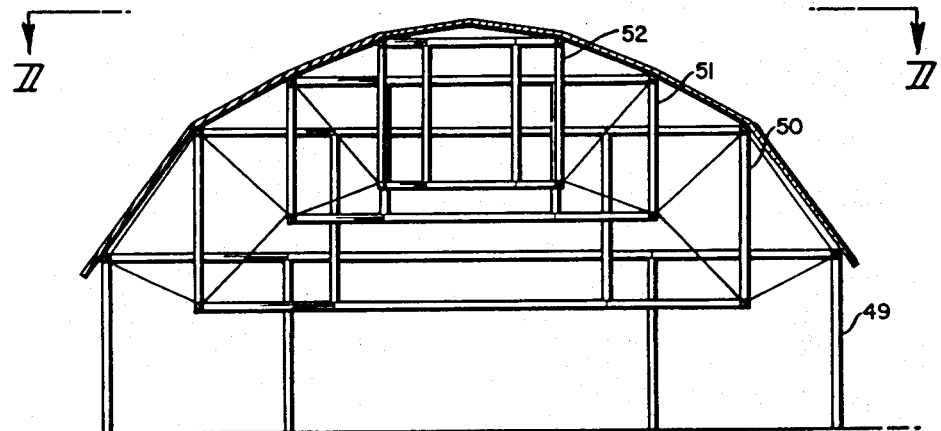
FIG. 6 is a diagrammatic vertical section of a still further embodiment of the invention.

FIGS. 6 and 7 shows the application of my invention to a structure of hexagonal form comprising the series of hexagonal frames 49, 50, 51, 52, each higher-numbered frame being suspended from the lower-numbered frame of the series. Here the extent of vertical overlapping between successive frames varies whereas the horizontal spacing remains contsant. This is incontradistinction to the arrangement of FIG. 1 in which the horizontal spacing between successive frames varies. The feasibility of varying both vertical overlap and horizontal spacing lends great flexibility to the design of the structure.

FIG. 12 shows the application of my invention to a rectangular form of structure comprising the series of rectangular frames 55, 56, 57. As before, these frames can be considered to be made up of struts in an open or skeletal framework or to be continuous as when made in the form of sheets or panels. The frames themselves may if desired be triangulated through the use of diagonal wires extending between the diagonally opposite corners of each side or facet of the frame. FIG. 13 may be considered as a diagrammatic section taken either on the central diagonal plane or a central plane bisecting the sides of the frames, $s$ being the suspension members and $a$ the anchoring members. Regarding FIG. 13 as the diagonal section, $s$ and $a$ are both disposed in a vertical plane containing the axis of the structure. Regarding FIG. 13 as the section bisecting the sides of the frames, $s$ and $a$ are crisscrossed both horizontally and vertically as will be understood from FIG. 12. In either case FIG. 13 gives a picture of the vertical components of the reach of the cables.

FIGS. 12–13, FIGS. 14–15 and FIGS. 16–17 are comparative views illustrative of the general scope of applicability of my suspension building system to structures utilizing several alternative dispositions of the suspension and anchoring cables. FIGS. 14 and 16 represent portions of the same frame arrangement shown in FIG. 12 but the arrangement of the tension members is different. The difference in this arrangement may best be discerned in FIG. 15 as compared with FIG. 13. In FIG. 15 suspension cables $s'$ extend in the same manner as the cables $s$ of FIG. 13 but the anchoring cables $a'$ extend between the upper corners of the successive frames in the series. FIGS. 16 and 17 shows another alternative arrangement of the tension members in which the anchoring cables $a''$ extend between the lower corners of the successive frames in the series. Thus in the construction of FIGS. 12–13 we have vertically crisscross cables whereas in FIGS. 14–15 and FIGS. 16–17, these cables do not cross one another although the tensioning pattern in all cases is triangulated, resulting in an omni-triangulated building construction. The differing patterns of triangulation may be combined in various ways, using one system at one side or facet of the structure and an alternate system in the adjacent side as may be desired. Another alternative arrangement would be to use only suspension elements $s$, $s'$ or $s''$ at one side of the series of frames and only anchoring elements $a$, $a'$ or $a''$ in the side adjacent and continuing this alternating suspension and anchoring in succeeding sides.

FIGS. 18 and 19 show the application of my invention to a spherical structure or to a segment of a spherical structure based on the spherical octahedron. Here we have a hemispherical dome comprising four spherical triangles of the octahedron defined by the intersections of three great circles 58, 59, 60. Relating these to the globe we have the great circle 58 at the equator, 59 at 0° and 180° longitude, and 60 at 90° and 270° of longitude. Two of the spherical triangles of the octahedron appear at 61 and 62. Each is subdivided by means of any selected number of spherical triangles of progressively smaller sizes arranged in a concentric array. These several concentric triangles form the inner or outer edges of frames of either skeletal or continuous form. Considering the frame array for spherical face 61 of the octahedron, we have the frames 63, 64, 65, 66. Considering the several frames of the series to be of the same radial depth (67=68=69=70), and reorienting the structure so that a line containing the center of spherical face 61 and the center of the sphere is vertical, we have, as in other forms of my invention, a series of box frames of progressively varying sizes arranged in a concentric array at sequentially different heights above a common plane of reference and in vertically overlapping spaced relation one to another. Also, as before, tension elements 71, 72, FIG. 19, extend between and are secured to adjacent pairs of the frames in the series. Tension elements 71 extend downwardly, i.e. inwardly of the sphere, from their points of securement to one frame of a pair to their respective points of securement to the other frame of the pair whereby successive frames in the series are suspended one from another. Tension members 72 extend upwardly from their points of securement to the lower frame of a pair to their respective points of securement to the upper frame of the pair whereby successive frames in the series are anchored down, i.e. inwardly of the sphere, one to another. It will be understood that the several tension elements serve all of the five functions described hereinabove, namely those of suspension, anchoring, buttressing, stabilizing of the frames themselves and resisting torquing and countertorquing of the frames about a line passing through the centers of the sphere and of the octahedral face. It may be mentioned that in FIG. 18 I have for simplicity of illustration omitted tension elements 71 and 72, the general arrangement of which will be understood from the description of the other forms of my invention. Also, it will be understood that any of the described alternate arrangements of the tension elements may be employed as desired.

The terms and expressions which I have employed are used in a descriptive and not a limiting sense, and I have no intention of excluding such equivalents of the invention described as fall within the scope of the claims.

I claim:

1. A structure comprising a series of box frames of progressively varying sizes arranged in a concentric array at predetermined sequentially different heights above a common plane of reference and in vertically overlapping spaced relation one to another, and tension elements extending between and fixedly secured to adjacent pairs of the box frames in said series, said tension elements including tension members extending downwardly from their points of fixed securement to the lower frame of a pair of their respective points of fixed securement to the upper frame of the pair whereby successive frames in the series are permanently suspended one from another in predetermined fixed positions.

2. A structure according to claim 1 in which said tension elements also include other tension members extending upwardly from their points of securement to the lower frame of a pair to their respective points of securement to the upper frame of the pair whereby successive frames in the series are anchored down one to another.

3. A structure comprising a series of cylindrical frames of progressively varying sizes arranged in a concentric array at predetermined sequentially different heights above a common plane of reference and in vertically overlapping spaced relation one to another, and tension elements extending between and fixedly secured to adjacent pairs of the cylindrical frames in said series, said tension elements including tension members extending downwardly from their points of fixed securement to the lower frame of a pair to their respective points of fixed securement to the upper frame of the pair whereby successive frames in the series are permanently suspended one from another in predetermined fixed positions.

4. A structure comprising a series of polygonal box frames of progressively varying sizes arranged in a concentric array at predetermined sequentially different heights above a common plane of reference and in vertically overlapping spaced relation one to another, and tension elements extending between and fixedly secured to adjacent pairs of the polygonal box frames in said series, said tension elements including tension members extending downwardly from their points of fixed securement to the lower frame of a pair to their respective points of fixed securement to the upper frame of the pair whereby successive frames in the series are permanently suspended one from another in predetermined fixed positions.

5. A structure according to claim 4 in which said tension elements also include other tension members extending upwardly from their points of securement to the lower frame of a pair to their respective points of securement to the upper frame of the pair whereby successive frames in the series are anchored down one to another.

6. A structure according to claim 4 in which said downwardly extending tension members include members disposed in radial planes containing the central axis of the structure.

7. A structure according to claim 6 in which said downwardly extending tension members are secured to the respective polygonal box frames at the vertices thereof.

8. A structure comprising a series of frusto-conical frames of progressively varying sizes arranged in a concentric array at predetermined sequentially different heights above a common plane of reference and in vertically overlapping spaced relation one to another, and tension elements extending between and fixedly secured to adjacent pairs of the frusto-conical frames in said series, said tension elements including tension members extending downwardly from their points of fixed securement to the lower frame of a pair to their respective points of fixed securement to the upper frame of the pair whereby successive frames in the series are permanently suspended one from another in predetermined fixed positions.

9. A structure comprising a series of box frames of progressively varying sizes arranged in a concentric array above a common horizontal plane of reference and in horizontally spaced relation one to another, and tension elements extending between and fixedly secured to adjacent pairs of the box frames in said series, said tension elements including tension members extending downwardly from their points of fixed securement to one frame of a pair to their respective points of fixed securement to the other frame of the pair whereby successive frames in the series are permanently suspended one from another in predetermined fixed positions.

10. A structure according to claim 9 in which said tension elements also include other tension members extending upwardly from their points of securement to one frame of a pair to their respective points of securement to the other frame of the pair whereby successive frames in the series are anchored down one to another.

11. A structure according to claim 10 in which said downwardly extending tension members include members disposed in radial planes containing the central axis of the structure.

References Cited in the file of this patent

UNITED STATES PATENTS

| | | |
|---|---|---|
| 2,576,389 | Craighead et al. | Nov. 27, 1951 |
| 2,621,765 | Wood | Dec. 16, 1952 |
| 2,689,025 | Yates | Sept. 14, 1954 |

UNITED STATES PATENT OFFICE
CERTIFICATE OF CORRECTION

Patent No. 3,139,957                                                     July 7, 1964

Richard Buckminster Fuller

It is hereby certified that error appears in the above numbered patent requiring correction and that the said Letters Patent should read as corrected below.

Column 1, line 41, for "of", second occurrence, read -- to --.

Signed and sealed this 10th day of November 1964.

(SEAL)
Attest:

ERNEST W. SWIDER                                        EDWARD J. BRENNER
Attesting Officer                                               Commissioner of Patents